(12) United States Patent
Fischer et al.

(10) Patent No.: US 12,542,243 B2
(45) Date of Patent: Feb. 3, 2026

(54) CYLINDRICAL CAPACITOR

(71) Applicant: ELECTRONICON Kondensatoren GmbH, Gera (DE)

(72) Inventors: Patrick Fischer, Gera (DE); Volker Geitner, Hundhaupten (DE); Marko Stoike, Wünschendorf/Elster (DE)

(73) Assignee: ELECTRONICON Kondensatoren GmbH, Gera (DE)

( * ) Notice: Subject to any disclaimer, the term of this patent is extended or adjusted under 35 U.S.C. 154(b) by 72 days.

(21) Appl. No.: 18/695,279

(22) PCT Filed: Oct. 14, 2022

(86) PCT No.: PCT/EP2022/078659
§ 371 (c)(1),
(2) Date: Mar. 25, 2024

(87) PCT Pub. No.: WO2023/094073
PCT Pub. Date: Jun. 1, 2023

(65) Prior Publication Data
US 2025/0132099 A1    Apr. 24, 2025

(30) Foreign Application Priority Data

Nov. 29, 2021  (DE) .......................... 202021106503.6
Jan. 4, 2022   (DE) .......................... 202022100064.6

(51) Int. Cl.
*H01G 11/12*  (2013.01)
*H01G 4/32*   (2006.01)

(52) U.S. Cl.
CPC .................................... *H01G 4/32* (2013.01)

(58) Field of Classification Search
None
See application file for complete search history.

(56) References Cited

U.S. PATENT DOCUMENTS 4,633,365 A * 12/1986 Stockman ............... H01G 2/14
                                                   361/275.2
10,153,088 B2  12/2018 Kessler
(Continued)

FOREIGN PATENT DOCUMENTS

CN   104051156 A   9/2014   ............ H01G 4/224
CN   104766722 A   7/2015   ............ H01G 4/228
(Continued)

OTHER PUBLICATIONS

The Notification Concerning Transmittal of International Preliminary Report on Patentability (Chapter I of the Patent Cooperation Treaty), in English, dated Jun. 13, 2024, which was issued by the International Bureau of WIPO in Applicant's corresponding international PCT application having Serial No. PCT/EP2022/078659, filed on Oct. 14, 2022.

(Continued)

*Primary Examiner* — Timothy J. Dole
*Assistant Examiner* — Esther N Lian
(74) *Attorney, Agent, or Firm* — Bodner & Bodner, PLLC; Christian P. Bodner; Gerald T. Bodner

(57) ABSTRACT

A cylindrical capacitor consists of a plurality of cylindrical winding elements which are stacked one on top of the other in the cylinder axial direction and have electrical contact surfaces on their end faces, the contact surfaces being connected to switching strips leading over the cylinder lateral surface and to at least one connection terminal in each case. Two substantially circular first and second connection discs are provided, which are adapted to the cylinder diameter and are electrically and mechanically isolated by an insulating element, wherein the first of the connection discs is electrically connected directly to a contact surface, lying in the direction of the connection terminal, of an upper cylindrical winding element.

10 Claims, 4 Drawing Sheets

(56) References Cited

U.S. PATENT DOCUMENTS

| | | | |
|---|---|---|---|
| 10,256,042 B2 | 4/2019 | Reinbold | |
| 11,404,215 B2 | 8/2022 | Gomez et al. | |
| 2014/0347784 A1* | 11/2014 | Stockman | H01G 4/32 |
| | | | 361/329 |

FOREIGN PATENT DOCUMENTS

| | | | | |
|---|---|---|---|---|
| CN | 104051156 B | 10/2017 | | H01G 4/224 |
| DE | 102011104255 A1 | 12/2012 | | H01G 4/228 |
| DE | 102016208381 A1 | 11/2017 | | H01G 4/228 |
| DE | 102018103166 A1 | 6/2019 | | H01G 2/22 |
| DE | 102018117283 B3 | 11/2019 | | H01G 4/228 |
| DE | 102018217048 A1 | 4/2020 | | H01G 4/00 |
| JP | H0419781 Y2 * | 5/1992 | | |
| JP | 2012069633 A * | 4/2012 | | |
| JP | 2012079757 A | 4/2012 | | H01G 4/18 |
| JP | 5424030 B2 * | 2/2014 | | |
| JP | 2016012654 A * | 1/2016 | | |
| JP | 2016192506 A * | 11/2016 | | |
| WO | WO-2013104808 A1 * | 7/2013 | | H01G 4/385 |
| WO | WO2019101802 | 5/2019 | | |
| WO | WO2019101802 A1 | 5/2019 | | H01G 2/02 |

OTHER PUBLICATIONS

The English translation of the International Preliminary Report on Patentability (Chapter I of the Patent Cooperation Treaty), dated May 2, 2024, which was issued by the International Bureau of WIPO in Applicant's corresponding international PCT application having Serial No. PCT/EP2022/078659, filed on Oct. 14, 2022.

The Written Opinion of the International Searching Authority, in English, dated Feb. 15, 2023, which was issued by the International Bureau of WIPO in Applicant's corresponding international PCT application having Serial No. PCT/EP2022/078659, filed on Oct. 14, 2022.

The International Search Report, in English, dated Feb. 15, 2023, which was issued by the International Bureau of WIPO in Applicant's corresponding international PCT application having Serial No. PCT/EP2022/078659, filed on Oct. 14, 2022.

A Search Report (in German), dated Aug. 13, 2022, issued by the German Patent Office for Applicant's corresponding German Patent Application No. DE202022100064.6, filed Jan. 4, 2022.

* cited by examiner

CYLINDRICAL CAPACITOR

The invention relates to a cylindrical capacitor, consisting of a plurality of cylindrical winding elements which are stacked one above the other in the longitudinal direction of the cylinder axis, which have electrical contact surfaces on their end faces, which are connected to switching strips which are guided over the cylinder jacket surface, and at least one connecting terminal according to the preamble of claim 1.

A contact assembly for end faces of capacitor windings is already known from DE 10 2018 117 283 B3.

The solution there is primarily concerned with the solderless construction of single-phase or multi-phase bucket capacitors, consisting of an electrically conductive spring element with a connection surface for a switching strip and/or a switching or fuse wire. The switching strips shown there can be made of a copper or aluminum material or another electrically conductive and weldable material. The spring element used there can be electrically and mechanically connected to the respective switching strip by welding. The capacitor coils used have contact surfaces on the end faces that are connected to the switching strip. A capacitor of this type can be inserted into a hollow cylindrical, cup-like housing and closed with a lid that has a corresponding connecting terminal. As an example, three capacitor windings are arranged on top of each other. The capacitor windings consist of a dielectric made of plastic film and two corresponding contact layers.

The upper ends of the switching strips are angled and guided onto an insulating disc. Furthermore, these ends of the switching strips are electrically connected to a switching or fuse wire.

In the capacitor with at least two winding elements according to DE 10 2018 103 166 A1, the capacitor comprises at least a first and a second busbar.

The first busbar and the second busbar connect the winding elements stacked next to each other on their lateral surfaces in parallel. The first busbar and the second busbar are arranged so that they overlap each other.

A corresponding winding element can be a capacitance unit. Each winding element of the known capacitor may have the same capacitance and may have a first pole of a first polarity and a second pole of a second polarity. The busbar is formed as a metallic strip or metallic bar and is configured for a local heavy current power distribution. Due to the overlapping of the first or second busbar, there is a small inductance of the connection of the busbars and between the winding elements of the capacitor stacked next to each other on their jacket surfaces.

A filter capacitor is already known from CN 104766722 A, in which the necessary electrical connections between the individual capacitors of a cylindrical assembly are realized via cylindrical surface segments. The aim here is to achieve the lowest possible inductive electrical connection. The connection segments mentioned must be manufactured as three-dimensional molded parts and are therefore tool-bound and must be adapted to the specific winding geometry. Universal use with regard to variable winding heights and diameters and with regard to the number of stacked windings is not possible with this prior art.

From the foregoing, it is the object of the invention to provide a further developed cylindrical capacitor which has very low inductive properties and which permits a structure consisting of a parallel connection of several winding elements stacked over their end faces, wherein the necessary internal circuitry is to be realized in a space-saving manner and with optimized electrical properties.

The object of the invention is solved by a cylindrical capacitor according to claim 1, consisting of a plurality of cylindrical winding elements which are stacked one above the other in the direction of the cylinder axis, i.e. axially one above the other, each of which has a winding capacitance.

The winding elements have electrical contact surfaces on their end faces, which are electrically connected to switching strips guided over the cylindrical surface. Furthermore, the cylindrical capacitor has at least one connecting terminal for each polarity.

According to the invention, two substantially circular first and second connecting discs adapted to the cylinder diameter are provided, which are electrically and mechanically separated from or by an insulating element.

The first, and therefore lower, of the connecting discs is electrically connected directly to a contact surface of an upper cylindrical winding element in the direction of the connecting terminal.

Furthermore, starting from the first connecting disc, a plurality of first switching strips are formed which are distributed over the cylinder jacket surface and extend substantially parallel, and which are each connected to a contact surface facing away from the connecting terminal of the number of winding elements.

Starting from the second of the connecting discs, a plurality of second switching strips are formed which are distributed over the cylinder jacket surface and extend congruently over the first switching strips.

These second switching strips lead to the other contact surfaces of the mutually stacked winding elements for the purpose of electrically connecting them in parallel, wherein an insulating layer or insulating sheath is provided at least in the overlapping area of the first and second switching strips.

The connecting discs are each connected to at least one connecting terminal or have at least one connecting terminal integrally formed therewith.

The surface shape of the switching strips is adapted to the cylinder radius or cylinder circumference in the area where they extend along the cylinder jacket surface. In other words, the switching strips fit snugly against the cylindrical circumferential surface of the respective winding elements.

The switching strips are preferably arranged symmetrically on the cylinder circumference side, for example in a group of two or four.

Furthermore, according to the invention, the switching strips are designed as a separate component and can be connected to the respective connecting disc, for example by welding or soldering.

The connecting discs have a substantially identical shape and size.

In one embodiment of the invention, the insulating element has a cap shape or the shape of a lid, wherein the edge of the cap or lid extends over a partial section of the upper winding element and the first switching strips connected thereto.

In one design of the invention, the number of stackable winding elements is between two and twelve.

The number of respective first or second switching strips, which are guided circumferentially over the jacket surface of the cylinder, is between two and six, preferably between two and four.

The first and second switching strips are arranged with maximum overlap.

The assembly according to the invention can be inserted into a cup in a known manner and closed with an integral or separate cup base or a cup lid, wherein the cup lid has openings to the connecting terminals, which are designed as screw terminals, for example.

The invention will be explained in more detail below with reference to an exemplary embodiment and with the aid of figures.

The polarity described in the drawings and in the exemplary embodiment is exemplary and could also be reversed, wherein.

Figure 1:
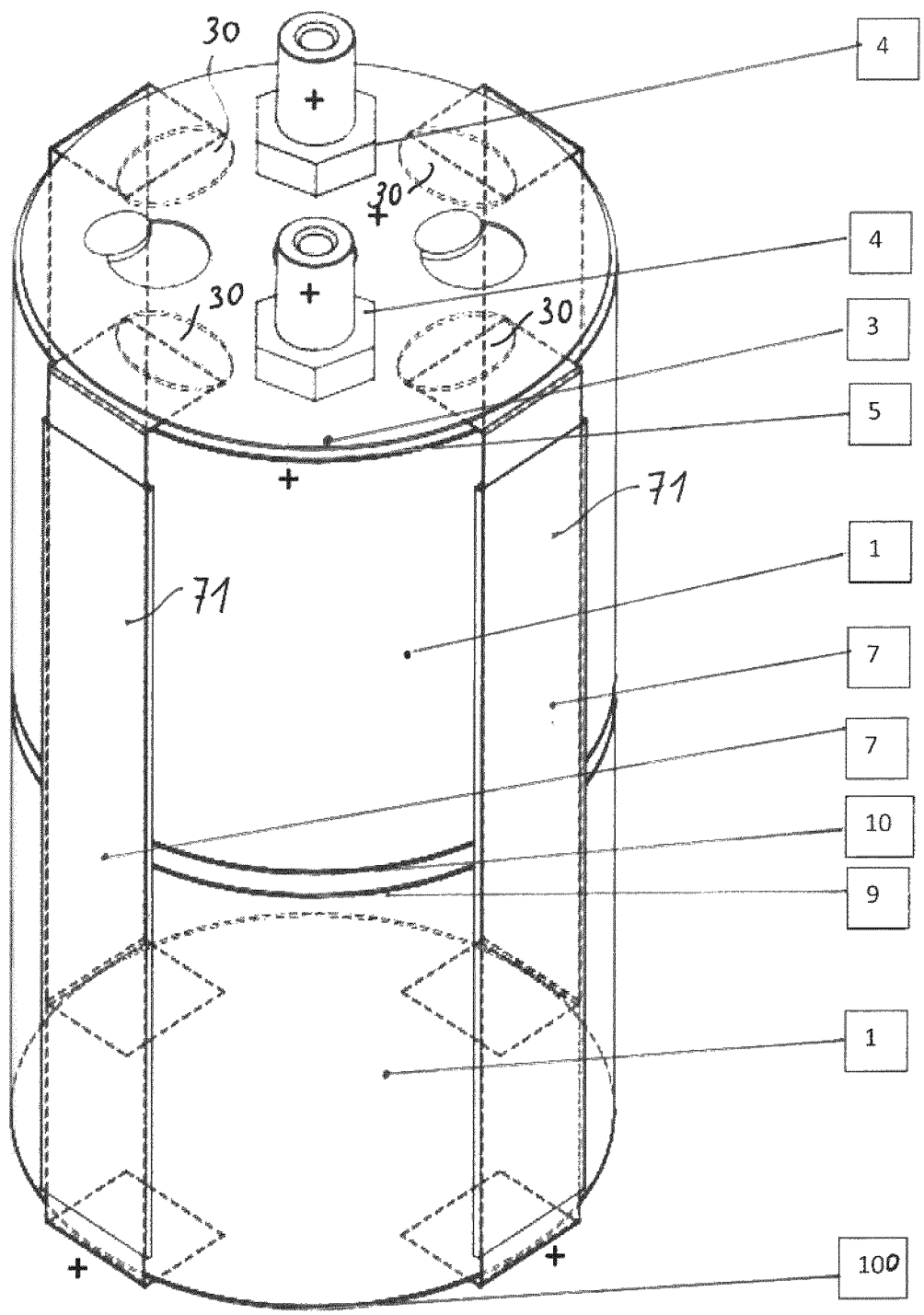
FIG. 1 shows a cylindrical capacitor without outer casing with two cylindrical winding elements stacked on top of each other and first switching strips leading to a first connecting disc.

The cylindrical capacitor shown in the figures consists of, for example, two cylindrical winding elements 1, which are arranged one above the other in a stack. A first connecting disc 3 is electrically connected directly to a contact surface 5 of the upper of the cylindrical capacitor windings 1, which is located in the direction of the connecting terminal 4.

Starting from this first connecting disc 3, the first switching strips 7 are distributed across the cylinder jacket surface and extend substantially parallel. In the example shown, there are four switching strips 7.

The switching strips 7 are surrounded by an insulating sheath 71 in the area where they extend in the longitudinal direction of the cylinder.

The lower end of the switching strips 7 is electrically connected to the lower contact surface of the lower of the cylindrical winding elements 1 facing away from the connecting terminal 4.

The connection of the two winding elements 1 is polarization-correct from the negative terminal pole of the upper winding to the negative terminal pole of the lower winding.

Figure 4:
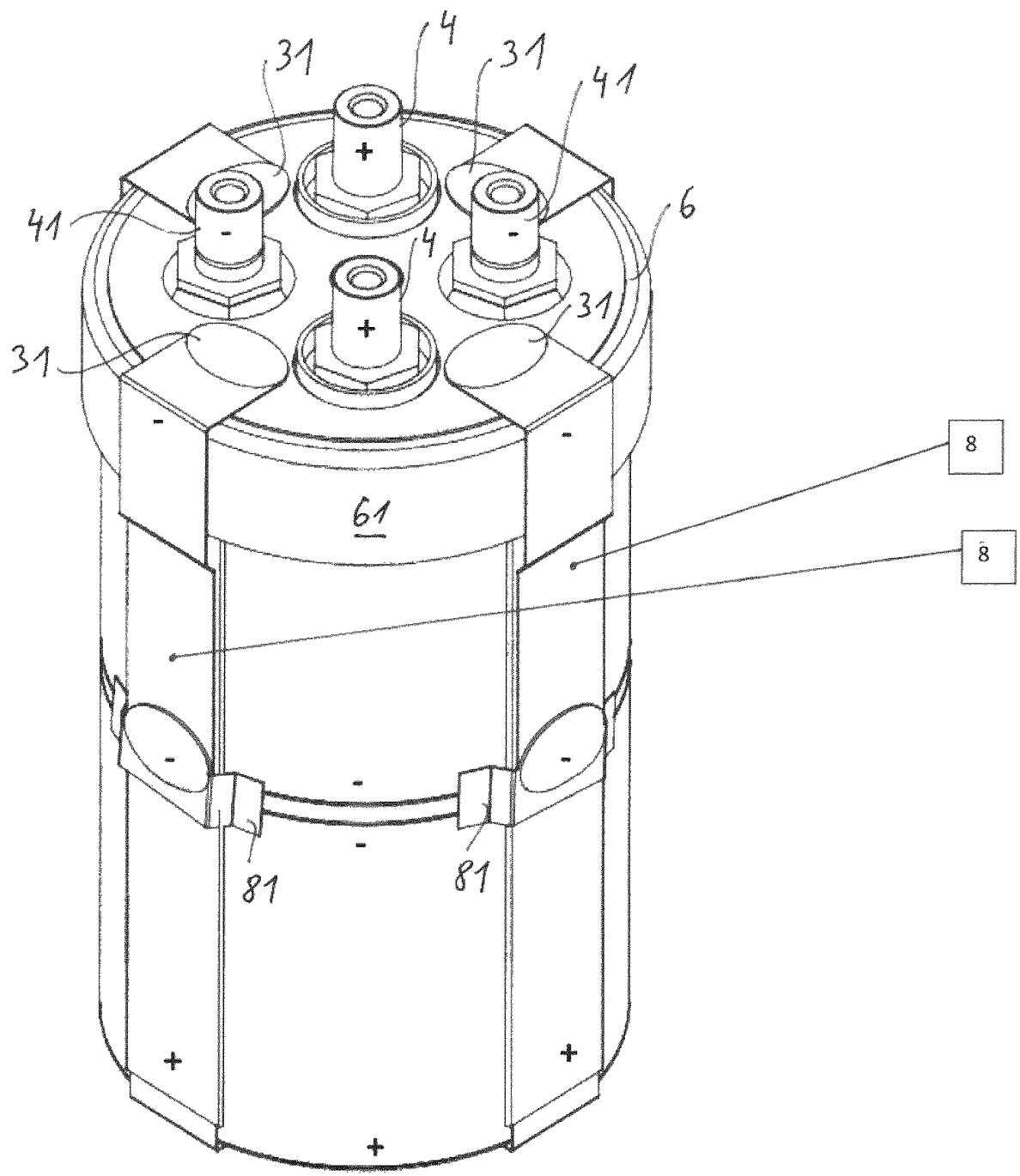
FIG. 4 shows a completed parallel connection of the two cylindrical winding elements stacked on top of each other with the corresponding connecting terminals and polarity (+/−) shown.

The contact surfaces 9 and 10 of the winding elements are located opposite each other in the quasi central area of the capacitor assembly and are also contacted there, as shown in the illustration according to FIG. 4, namely with further, second switching strips 8.

The contact surface of the lower coil 1 facing away from the connecting terminal 4 is marked with the reference sign 100 to distinguish it from the contact surface of the upper coil.

The switching strips 7 are angled over the end faces of the corresponding winding elements and connected to the connecting disc 3 by soldering or welding at points 30 or electrically contacted accordingly in the area of the lower contact surface 100.

Figure 2:
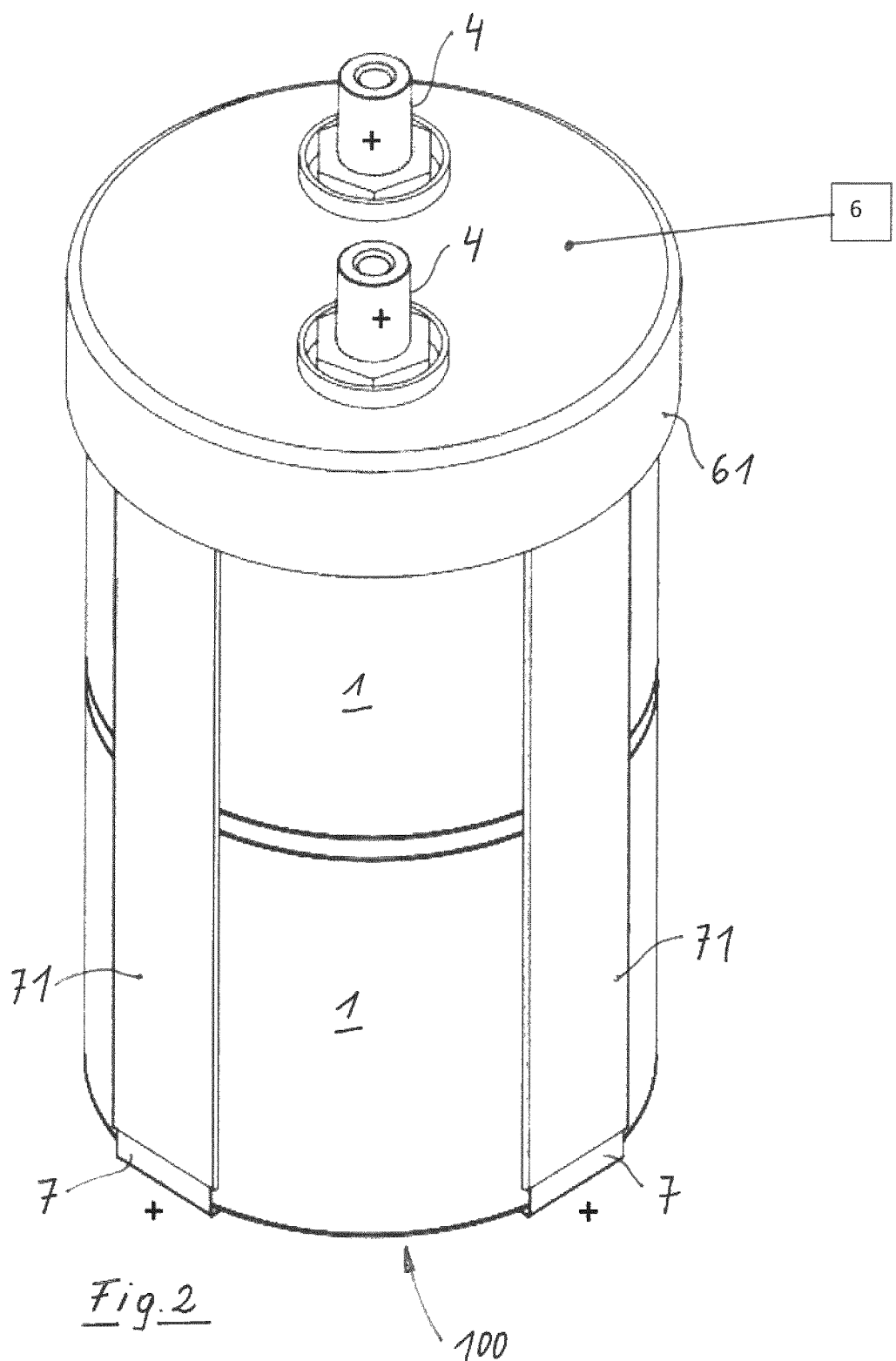
FIG. 2 shows an illustration similar to that shown in FIG. 1, but with an insulating element arranged in the upper area of the capacitor structure.

The illustration according to FIG. 2 now shows the assembly of a cap-shaped insulating element 6. This insulating element 6 serves to electrically insulate the angled ends of the switching strips 7 together with their connection areas 30 with the first connecting disc 3. At the same time, the edge of the cap 61 extends downwards in the direction of the longitudinal axis of the cylinder and covers the upper section of the switching strips 7 and the edges of the contact surface 5.

Figure 3:
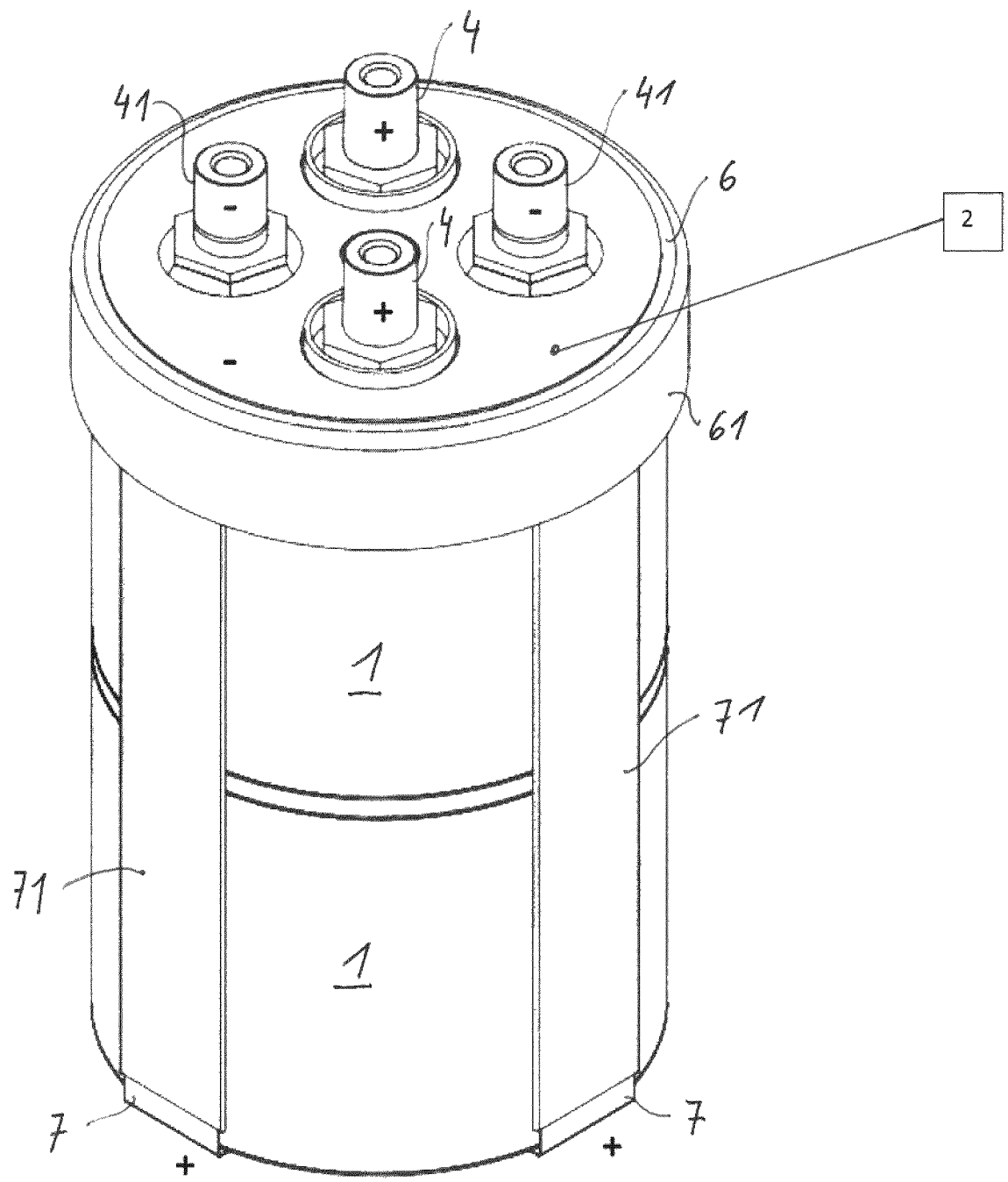
FIG. 3 shows a representation similar to that shown in FIG. 2, but with a second connecting disc with corresponding terminals arranged above the cap-like insulating element.

In the illustration according to FIG. 3, a second connecting disc 2 comprising further terminals 41 is realized above the insulating element 6 with its cap edge 61.

The other switching strips 8, which also have the necessary electrical connection in areas 31, are now routed to this second connecting disc 2.

The second connecting disc 2 has positive polarity, which therefore also applies to the connecting terminals 41.

The second switching strips 8 lead to the middle area between the stacked winding elements 1, specifically to the contact surfaces 9 and 10 there (see also FIG. 1). A corresponding electrical connection is realized, for example, with the aid of electrically conductive angle elements 81.

The connection is made in such a way that an electrical parallel connection of the exemplary two stacked cylindrical winding elements 1 is obtained.

According to the exemplary embodiment, a cylindrical capacitor with two to twelve winding elements stacked in the direction of the cylinder axis is thus realized. The capacitor assembly has a first and a second, preferably circular, connecting disc. These each comprise one or two terminals. The switching strips or strip conductors are not an integral part of the connecting discs, but are connected to the connecting discs on the outside.

One of the two connecting discs is directly connected to a first contact surface of the upper of the winding elements.

The overlapping and mutually electrically insulated switching strips are installed symmetrically on the outside, preferably in two to four copies, and alternately contact the touching upper contact surfaces 9 and the lower contact surfaces 10 of the winding elements 1. Each upper contact surface of each winding element and each lower contact surface of each winding element is alternately connected to an electrical potential of the connecting discs, so that the necessary parallel connection results.

An exemplary setup has shown that the example capacitor with two windings and a capacitance of approx. 500 µF has a self-inductance of only approx. 6.5 nH when using the described multi-band circuit with overlapping switching strips. This is well below the values that can be achieved with a standard connection of the same capacitor windings within a cylindrical capacitor without overlapping switching strips.

When the example capacitor was set up with the same capacitance, but with four winding elements, a self-inductance of approx. 5 nH was achieved.

The invention claimed is:

1. Cylindrical capacitor, consisting of a plurality of cylindrical winding elements which are stacked one above the other in the direction of the cylinder axis and have electrical contact surfaces on their end faces, which contact surfaces are connected to switching strips which are guided over the cylinder jacket surface, and each having at least one connection terminal, characterized in that two substantially circular first and second connecting discs adapted to the cylinder diameter are provided, which are electrically and mechanically separated from an insulating element, wherein the first of the connecting discs is directly electrically connected to a contact surface located in the direction of the connecting terminal of an upper cylindrical winding element, further, starting from the first connecting disc, a plurality of first switching strips are formed which are distributed over the cylinder jacket surface and extend substantially parallel and which are each connected to a contact surface facing away from the connecting terminal of a further winding element, starting from the second of the connecting discs, a plurality of second switching strips are formed which are distributed over the cylinder jacket surface and extend congruently over the first switching strips and which lead to the further contact surfaces of the winding elements for the electrical parallel connection thereof, wherein an insulating layer or insulating sheath is provided at least in the overlapping region of the first and second switching strips.

2. Cylindrical capacitor according to claim 1,
characterized in that
the connecting discs are each connected to at least one connecting terminal or have at least one integrally formed connecting terminal.

3. Cylindrical capacitor according to claim 1,
characterized in that
the surface shape of the switching strips is curved to the cylinder radius in the region of their extension along the cylinder jacket surface and is adapted accordingly.

4. Cylindrical capacitor according to claim 1,
characterized in that
the switching bands are arranged symmetrically on the cylinder circumference side.

5. Cylindrical capacitor according to claim 1,
characterized in that
the switching bands are designed as a separate component and can be connected to the respective connecting disc.

6. Cylindrical capacitor according to claim 1,
characterized in that
the connecting discs have a substantially identical shape and size.

7. Cylindrical capacitor according to claim 1,
characterized in that
the insulating element has a cap shape, wherein the cap edge extends over a partial section of the upper winding element and the first switching strips connected thereto.

8. Cylindrical capacitor according to claim 1,
characterized in that
the number of stackable winding elements is between two and twelve.

9. Cylindrical capacitor according to claim 1,
characterized in that
the number of the respective first or second switching bands, which are guided circumferentially over the jacket surface of the cylinder, is between two and six.

10. Cylindrical capacitor according to claim 1,
characterized in that
the first and second switching bands are arranged with maximum overlap.

* * * * *